(12) United States Patent
Robinson et al.

(10) Patent No.: US 8,675,989 B2
(45) Date of Patent: Mar. 18, 2014

(54) OPTIMIZED ORTHONORMAL SYSTEM AND METHOD FOR REDUCING DIMENSIONALITY OF HYPERSPECTRAL IMAGES

(75) Inventors: Ian S. Robinson, Redondo Beach, CA (US); Bradley Flanders, Whittier, CA (US)

(73) Assignee: Raytheon Company, Waltham, MA (US)

( * ) Notice: Subject to any disclaimer, the term of this patent is extended or adjusted under 35 U.S.C. 154(b) by 238 days.

(21) Appl. No.: 13/085,883

(22) Filed: Apr. 13, 2011

(65) Prior Publication Data
US 2012/0263382 A1    Oct. 18, 2012

(51) Int. Cl.
*G06K 9/36* (2006.01)

(52) U.S. Cl.
USPC .......................................... 382/276; 382/232

(58) Field of Classification Search
USPC ......... 382/191, 190, 224, 248, 225, 251, 294; 348/133, 145, 152, 161, 169–171; 342/188–189, 196
See application file for complete search history.

(56) References Cited

U.S. PATENT DOCUMENTS

| | | | | |
|---|---|---|---|---|
| 6,075,891 | A * | 6/2000 | Burman | 382/191 |
| 6,208,752 | B1 | 3/2001 | Palmadesso et al. | |
| 6,665,438 | B1 * | 12/2003 | Lin | 382/191 |
| 6,701,021 | B1 * | 3/2004 | Qian et al. | 382/253 |
| 6,750,964 | B2 * | 6/2004 | Levenson et al. | 356/326 |
| 6,782,138 | B1 | 8/2004 | Leisner et al. | |
| 6,804,400 | B1 * | 10/2004 | Sharp | 382/239 |
| 6,859,275 | B2 | 2/2005 | Fateley et al. | |
| 6,940,999 | B2 * | 9/2005 | Lin | 382/103 |
| 6,952,499 | B1 | 10/2005 | Vititoe | |
| 7,180,588 | B2 | 2/2007 | Geshwind et al. | |
| 7,194,111 | B1 | 3/2007 | Schaum et al. | |
| 7,251,376 | B2 | 7/2007 | Qian et al. | |
| 7,356,201 | B2 | 4/2008 | Gunther et al. | |
| 7,463,778 | B2 | 12/2008 | Damera-Venkata | |
| 7,486,734 | B2 | 2/2009 | Machida | |
| 7,680,337 | B2 * | 3/2010 | Gruninger et al. | 382/191 |

(Continued)

FOREIGN PATENT DOCUMENTS

| | | |
|---|---|---|
| CN | 101763445 | 6/2010 |
| WO | 2010056254 A1 | 5/2010 |
| WO | 2010141114 A2 | 12/2010 |

OTHER PUBLICATIONS

Ming-Fei Jiang; Xiao-Feng Li; Xin Luo, "A robust estimation of virtual dimensionality in hyperspectral imagery," Computational Problem-Solving (ICCP), 2010 International Conference on , vol., No., pp. 374,378, Dec. 3-5, 2010.*

(Continued)

*Primary Examiner* — Andrae S Allison
(74) *Attorney, Agent, or Firm* — Pierce Atwood LLP; Joseph M. Maraia

(57) ABSTRACT

A method for reducing dimensionality of hyperspectral images includes receiving a hyperspectral image having a plurality of pixels. The method may further include establishing an orthonormal basis vector set comprising a plurality of mutually orthogonal normalized members. Each of the mutually orthogonal normalized members may be associated with one of the plurality of pixels of the hyperspectral image. The method may further include decomposing the hyperspectral image into a reduced dimensionality image, utilizing calculations performed while establishing said orthonormal basis vector set. A system configured to perform the method may also be provided.

13 Claims, 6 Drawing Sheets

(56) References Cited

U.S. PATENT DOCUMENTS

| | | | |
|---|---|---|---|
| 7,773,828 B2 | 8/2010 | Sakata et al. | |
| 8,150,195 B2* | 4/2012 | Demirci et al. | 382/260 |
| 8,165,344 B2 | 4/2012 | Shiraska | |
| 8,175,393 B2* | 5/2012 | Robinson | 382/194 |
| 8,315,472 B2* | 11/2012 | Robinson et al. | 382/254 |
| 8,391,961 B2* | 3/2013 | Levenson et al. | 600/476 |
| 2003/0012398 A1 | 1/2003 | Sunshine et al. | |
| 2004/0218172 A1 | 11/2004 | DeVerse et al. | |
| 2006/0188161 A1 | 8/2006 | Gruninger et al. | |
| 2009/0074297 A1 | 3/2009 | Robinson | |
| 2010/0303371 A1 | 12/2010 | Robinson et al. | |
| 2012/0224782 A1* | 9/2012 | Robinson et al. | 382/254 |

OTHER PUBLICATIONS

Joseph C. Harsanyi and Chein-I Chang, "Hyperspectral Image Classification and Dimensionality Reduction: An Orthogonal Subspace Projection Approach," ZEEE Tmns. on Geoscience and Remote Sensing, 32(4), Jul. 1994.*
R.A. Neville, K. Staenz, T. Szeredi, J. Lefebvre, and P. Hauff, "Automatic endmember extraction from hyperspectral data for mineral exploration", 4th Int. Airborne Remote Sensing Conf. Exhibition/21st Canadian Symposium on Remote Sensing, pp. 891-896 1999.*
Orthogonality and Least Squares, http://www.aerostudents.com/files/linearAlgebra/orthogonalityLeastSquares.pdf, Jul. 2009.*
Robinson, I.S.; Nguyen, M.H.; Tull, J.; Augustin, S.; Weisberg, A.; Lushalan Liao; Borowski, B., "Comparison of hyperspectral subpixel detection with and without a priori knowledge of target features," Aerospace Conference, 1998 IEEE, vol. 5, No., pp. 183,189 vol. 5, Mar. 21-28, 1998.*
Dimitris Manolakis, David Marden, Gary A. Shaw, Hyperspectral Image Processing for Automatic Target Detection Applications, http://www.cis.rit.edu/~cnspci/references/dip/manolakis2003.pdf, 2003.*
Intl. Preliminary Report on Patentability dated Aug. 29, 2011 of PCT/US2010/024192 filed Feb. 12, 2010 (21 pages).
Sun, L., et al., "Improved Iterative ERror Analysis for Endmember Extraction from Hyperspectral Imagery", SPIE Imaging Spectrometry XIII, vol. 708, pp. 400-407, Intro., Sec. 2.2—pp. 3-5 (Aug. 2008).
Rogge, D. M., et al., "Iterative Spectral Unmixing for Optimizing Per-Pixel Endmember Sets", IEEE Transactions on Geoscience and Remote Sensing, IEEE Service Center, vol. 44, No. 12, pp. 3725-3736 (Dec. 2006).
Veganzones, M. A., et al., "Endmember Extraction Methods: A Shrot Review", pp. 400-407 (Sep. 2008).
Duran, O., et al., "A Time-Efficient Method for Anomaly Detection in Hyperspectral Images", IEEE Transactions on Geoscience and Remote Sensing, IEEE Service Ctr., NJ, US, vol. 45, No. 12, pp. 3894-3904 (Dec. 2007).
Plaza, A., et al., "Spatial/Spectral Endmember Extraction by Multidimensional Morphological Operations", IEEE Transactions on Geoscience and Remote Sensing, IEEE Service Ctr,, NJ, US, vol. 40, No. 9, pp. 2025-2029 (Sep. 2002).
Plaza, A., et al., "A New Approach to Mixed Pixel Classification of Hyperspectral imagery based on extended Morphological Profiles", Pattern Recognition, Elsevier, vol. 37, No. 6, pp. 1097-1116 (Jun. 2004).
Rogge, D. M., et al., "Integration of spatial-spectral information for the improved extraction of endmembers", Remote Sensing of Environment, Elsevier, vol. 110, No. 3, pp. 387-303 (Aug. 2007).

Filippi, A. M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).
Intl Search Report & Written Opinion dated Apr. 27, 2011 of PCT/US2010/024192 filed Feb. 12, 2010 (18 pages).
PCT/US2010/024192 filed Feb. 12, 2010 Partial International Search Report, Feb. 21, 2011.
Nirmal, Spectral Unmixing, IEEE Signal Processing Magazine, vol. 19, 2002.
International Search Report for International Patent Application No. PCT/US2008/083738 dated Feb. 9, 2009.
Kuybeda, et al., "Global unsupervised anomaly extraction and discrimination in hyperspectral images via maximum orthogonal-complements analysis," Feb. 2008, Department of Electrical Engineering Technion IIT, Haifa 32000, Israel, Retrieved from Internet:<URL:http://webee.technion.ac.il/uploads/file/publication/684.pdf.
Manolakis, et al., "Is there a best hyperspectral detection algorithm?", SPIE—Newsroom pp. 1-3 2009.
Bayazit, "Region adaptive spectral transformation for wavelet based color image compression," Image Processing (CIP), 16th International Conference on, IEEE, pp. 2817-2820, 2009.
Dohyun, et al., "Rate-distortion optimized image compression using generalized principal component analysis," Acoustics, Speech and Signal Processing, 2006 ICASSP 2006 Proceedings, IEEE International Conference on Toulouse, pp. 5-8, 2006.
Memarsadeghi, "A fast implementation of the isodata clustering algorithm," IJCGA, vol. 17, pp. 71-103, 2007.
Wei, et al., "Empirical comparison of fast clustering algorithms for large data sets," Proceedings of the 33rd Hawaii International Conference on System Sciences, pp. 1-10, 2000.
Yan, et al., "Fast approximate spectral clustering," KDD 2009, Paris, France.
Meza, et al., "Applied non-uniformity correction algorithm for striping noise removal in hyperspectral images," downloaded from Internet: http://nuc.die.udec.cl/publications/papers/2010-NUCStrippingNoise.pdf on Nov. 20, 2012.
Duarte, "Structured compressed sensing from theory to applications," IEEE Transactions in Signal Processing, 2011.
Pickering, "Compression of hyperspectral data using vector quantisation and the discrete cosine transform," Image Processing 2000 Proceedings. 2000 International Conference of Sep. 10-13, 2000, IEEE, pp. 195-198, vol. 2.
Leathers, et al., "Scene-based nonuniformity corrections for optical and SWIR pushbroom sensors," Optics Express, 13(13):5136-5150, 2005.
Winter, "Comparison of approaches for determining end-members in hyperspectral data," IEEE 2000.
Plaza, et al., "A quantitative and comparative analysis of endmember extraction algorithms from hyperspectral data," IEEE 2004.
Boardman, et al., "Mapping target signatures via partial unmixing of aviris data," Citeseer 1995.
Winter, "N-FINDR: an algorithm for fast autonomous spectral endmember determination in hyperspectral data," SPIE 1999.
Xuetao Tao et al., "Orthogonal Bases Approach for the Decomposition of Mixed Pixels in Hyperspectral Imagery", IEEE Geoscience and Remote Sensing Letters, IEEE Service Center, NY v. 6, n. 2, pp. 219-223, (2009).
Jing Zhang et al., "A Novel classified Residual DCT for Hyperspectral Images Scalable Compression (Abstract)", Picture coding symposium, Jul. 11, 2007, Lisbon.
Gruninger et al., "The sequential maximum angle convex cone (SMACC) endmember models," SPIE, PO Box 10 Bellingham, WA, Apr. 30, 2004.

* cited by examiner

OPTIMIZED ORTHONORMAL SYSTEM AND METHOD FOR REDUCING DIMENSIONALITY OF HYPERSPECTRAL IMAGES

CROSS-REFERENCE TO RELATED APPLICATIONS

This application is related to U.S. patent application Ser. No. 12/475,145, entitled "System and Method for Reducing Dimensionality of Hyperspectral Images," filed May 29, 2009, and is related to U.S. patent application Ser. No. 11/856,588, entitled "Hyperspectral Image Dimension Reduction System and Method," filed Sep. 17, 2007, the disclosures of both of which are hereby incorporated by reference in their entireties.

BACKGROUND

This disclosure relates to compression and dimensionality reduction (DIMRED) of hyperspectral image data, based on an optimized set of basis vectors. While compression reduces the size of a data set, it typically results in a loss of access to information content. On the other hand, DIMRED techniques provide compression with the ability to extract information from the data set in its reduced size. Thus, while all DIMRED techniques provide compression, not all compression techniques allow for DIMRED.

Hyperspectral sensors can collect image data cross a multitude of spectral bands through a combination of technology associated with spectroscopy and remote imaging. Thus, such sensors can capture sufficient information to derive a generally contiguous spectrum for each pixel in an image. In addition to having a color value, each pixel in the image additionally has a third dimension for a vector providing distinct information for the pixel over a large spectrum of wavelengths. This contiguous spectrum may be analyzed to separate and evaluate differing wavelengths, which may permit finer resolution and greater perception of information contained in the image. From such data, hyperspectral imaging systems may be able to characterize targets, materials, and changes to an image, providing a detection granularity which may exceed the actual resolution of pixels in the image and a change identification capability that does not require pixel level registration, which may provide benefits in a wide array of practical applications.

Because each pixel carries information over a wide spectrum of wavelengths, the size of a hyperspectral data set may often quickly become unwieldy in terms of the size of data that is being recorded by the hyperspectral sensor. As an example, hyperspectral sensors are often located remotely on satellites or aircraft capable of imaging areas in excess of 500 km×500 km per hour, which may result in the hyperspectral sensors generating anywhere from three to fifteen gigabits of data per second. Where the hyperspectral data needs to be processed in near real time, the large size of the data may introduce latency problems. In some cases, it may be desirable to transmit the data to a remote location for processing or other analysis, which again would make a reduced data size desirable.

Although the transmission rate for hyperspectral images can be increased using existing lossy and/or lossless compression techniques, these techniques also suffer from various drawbacks. For example, while lossy compression methods may be fine for casual photographs or other human viewable images, wherein the data that is removed may be beyond the eye's ability to resolve, applying such lossy compression methods to a hyperspectral data set may remove information that is valuable and desired for further computer or mathematical processing. Such removal of data may undermine the ability to characterize targets, materials, or changes to scenes that are captured in hyperspectral images. Lossless data compression would not remove such valuable information, since lossless algorithms produce a new data set that can subsequently be decompressed to extract the original data set. Although general purpose lossless compression algorithms can theoretically be used on any type of data, existing lossless compression algorithms typically cannot achieve significant compression on a different type data than that which the algorithms were designed to compress. Thus, existing lossless compression algorithms do not provide a suitable guaranteed compression factor for hyperspectral images, and in certain cases, the decompressed data set may even be larger than the original data set.

DIMRED techniques strike a balance between the loss of data resulting from lossy compression, and the increased processing requirements of lossless techniques. For example, the DIMRED techniques may identify information that is of particular importance, and segregate it such that it is not compressed, while compressing the remaining information that is of less value. Thus, the use of DIMRED on hyperspectral data sets allows for transformation of the hyperspectral image into a more compact form, with little to no loss of the most relevant information. At the same time, it is advantageous for DIMRED techniques to facilitate rapid processing of a reduced hyperspectral image data set. Typically for DIMRED of hyperspectral images, a family of functions or a set of vectors are found whose arithmetic combination can represent all of the data in a three-dimensional (3D) data set. Hyperspectral image data is generally discrete, so at each X/Y location in a hyperspectral image the spectral data may form elements of a vector. Depending on the nature of these vectors, they may either be characterized as endmembers (EMs) or basis vectors (BVs). While BVs span the data obtained from the image, and form a mathematical basis for the data, EMs are pixels from an imaged scene (or extrapolations of pixels in the scene), that represent the spectra of a pure material found in the scene. In some cases, EMs are derived such that they enclose or bound the data set (as in a hypervolume or a simplex).

Among other things, it is advantageous to increase the speed at which the dimensionality of hyperspectral images is reduced, and to improve the identification of which data is to be compressed or not.

SUMMARY

According to an embodiment, a method for reducing dimensionality of hyperspectral images includes receiving, from a sensor, a hyperspectral image having a plurality of pixels. The method may further include, by using a processor, establishing an orthonormal basis vector set comprising a plurality of mutually orthogonal normalized members, each associated with one of the plurality of pixels. The method may further include, by using the processor, decomposing the hyperspectral image into a reduced dimensionality image utilizing calculations performed while establishing said orthonormal basis vector set.

According to another embodiment, a system for reducing dimensionality of hyperspectral images includes one or more storage devices, and one or more processors operatively coupled to the one or more storage devices. The one or more processors may be configured to receive, from the one or more storage devices, a hyperspectral image having a plurality of pixels. The one or more processors may be additionally configured to establish and store an orthonormal basis vector set comprising a plurality of mutually orthogonal normalized members, each associated with one of the plurality of pixels. Furthermore, the one or more processors may be configured to decompose the hyperspectral image into a reduced dimensionality image utilizing calculations performed while establishing said orthonormal basis vector set.

Other features of this disclosure and the inventive concept described herein will be apparent to those skilled in the art based on the following drawings and detailed description.

DETAILED DESCRIPTION

Figure 1:
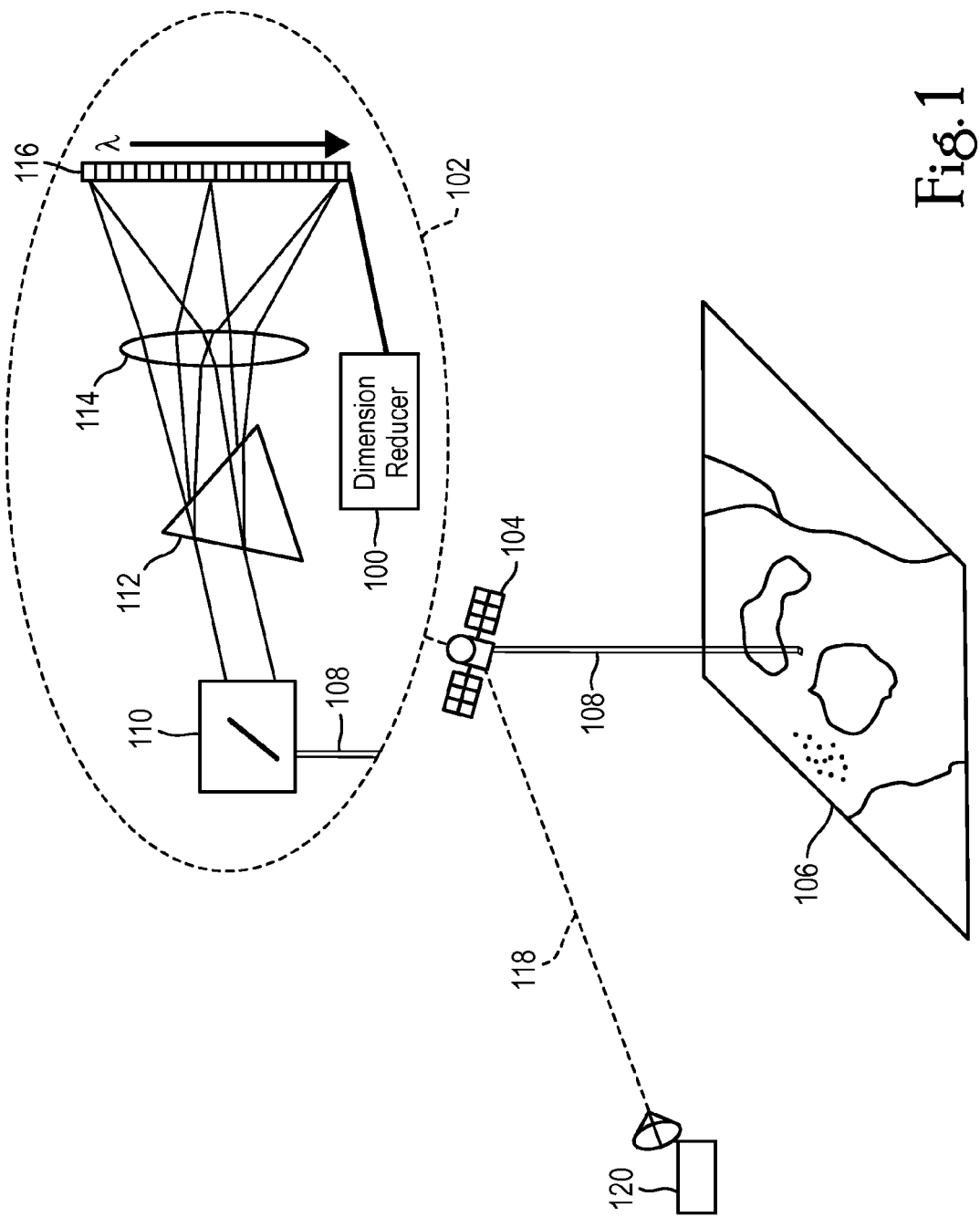
FIG. 1 illustrates an exemplary system for reducing dimensionality of one or more hyperspectral images, according to an embodiment.

Depicted in FIG. 1 is an embodiment of DIMRED system 100 that is configured to reduce a dimensionality of hyperspectral images. As shown, hyperspectral imaging system 102 may incorporate DIMRED system 100, and may be coupled to or otherwise contained within remote imaging system 104. Remote imaging system 104 may be of any suitable construction or configuration, including but not limited to comprising a satellite, an aerial surveillance system, or any other system that can capture hyperspectral images. In an embodiment, remote imaging system 104 may be configured to capture one or more images of a particular scene 106 corresponding to a geographical area.

In an embodiment, remote imaging system 104 may be configured to use hyperspectral imaging system 102 to capture a hyperspectral image of scene 106. Scene 106 may correspond to the geographical area, for example, where remote imaging system 104 is located on a space-based satellite, an airplane, or other elevated imaging system. In an embodiment, hyperspectral imaging system 102 may include one or more scan mirrors 110, or may include other optics arranged to receive light 108 from one or more ground resolution cells. In an embodiment, scan mirrors 110 or the other optics may then direct light 108 through dispersing element 112, which may be arranged to separate light 108 into various different wavelengths (i.e. a spectra). After being separated into the various different wavelengths, light 108 may then be directed to one or more imaging optics 114, which may focus the various wavelengths onto detector array 116. As such, detector array 116 may capture hyperspectral data across the spectrum of wavelengths, thereby generating a data set corresponding to a hyperspectral image of scene 106.

Following the generation of the data set corresponding to the hyperspectral image of scene 106, DIMRED system 100 may process the data set so as to reduce the dimensionality of the hyperspectral image. In an embodiment, as described in greater detail below, the degree to which the dimensionality of the image is reduced and/or whether the dimensionality reduction is to be classified as lossy or lossless may be determined by adjustable features of DIMRED system 100. As such, after the dimensionality of the hyperspectral image has been reduced, a data set corresponding to the reduced hyperspectral image may be processed in various ways. For example, in an embodiment, the reduced hyperspectral image may be processed to characterize targets or materials in scene 106, detect changes between various different hyperspectral images captured for scene 106, or perform other analytics on the reduced data set for the hyperspectral image.

In some embodiments, DIMRED system 100 may contain or otherwise provide a front end interface for one or more local processors associated with remote imaging system 104. In some such embodiments, the one or more processors may be configured to analyze the reduced data set for the hyperspectral image without requiring the reduced data set to be decompressed or otherwise processed to reconstruct an original (i.e., unreduced) data set for the hyperspectral image. In some embodiments, DIMRED system 100 may alternatively or additionally be configured to compress the hyperspectral image, wherein the reduced data set can be communicated rapidly within transmission 118 to remote station 120, which may be a ground station or other remote location where the data set can be further processed. For example, remote station 120 or other processing locations may analyze the reduced data set for the hyperspectral image without further decompression, after decompressing the reduced data set to produce the original data set, or any appropriate combination thereof.

Figure 2:
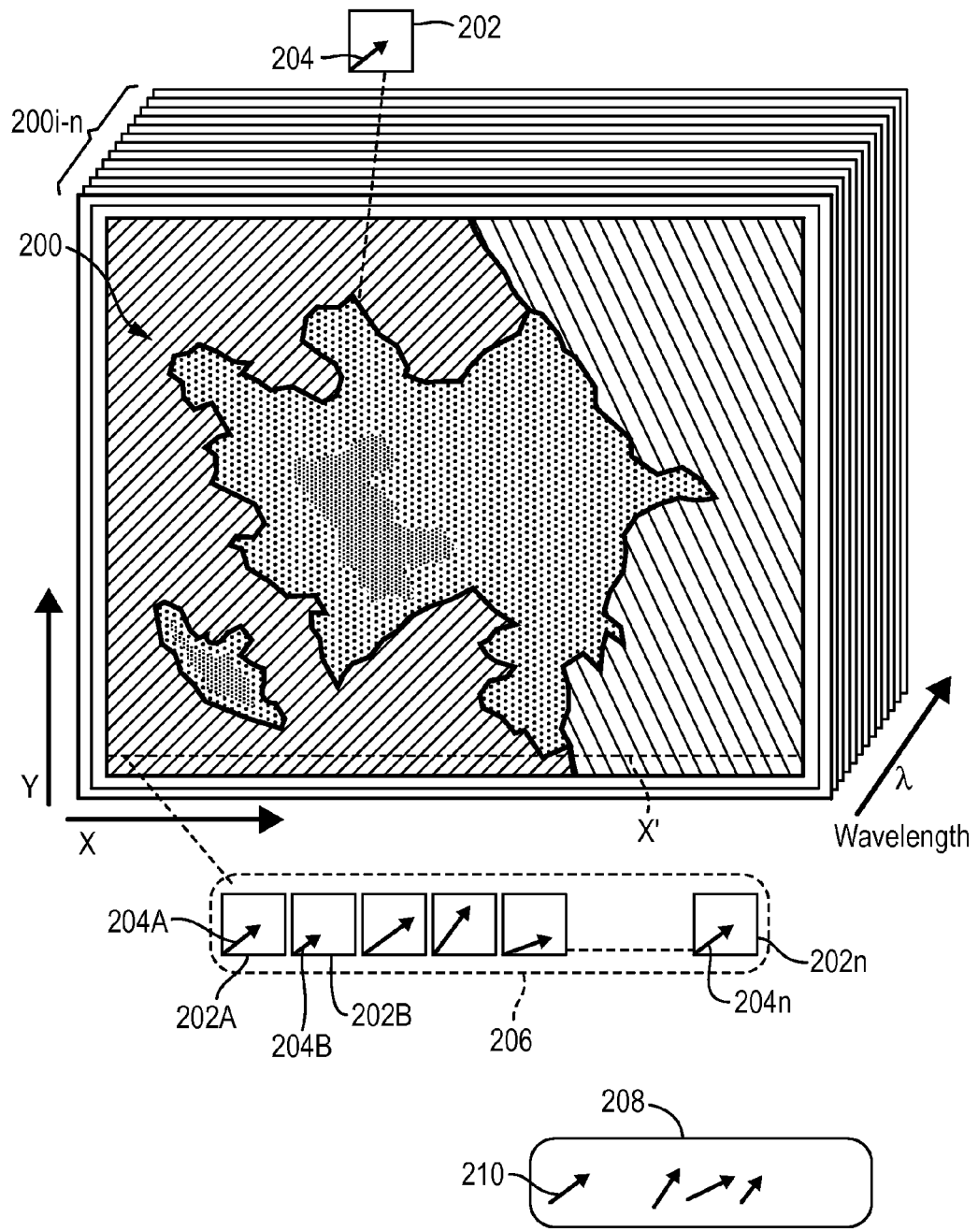
FIG. 2 illustrates an exemplary representation of one or more hyperspectral images, according to an embodiment.

FIG. 2 provides an exemplary representation of hyperspectral image 200, which may generally include a plurality of images 200$i$-$n$, which may be acquired in a substantially simultaneous manner across various different wavelength ($\lambda$) bands. As shown in FIG. 2, hyperspectral image 200 may include a plurality of pixels 202 arranged according to an x-y coordinate system, although it will be apparent that alternate coordinate systems may be employed in various circumstances. In an embodiment, each respective pixel 202 may have spectral vector 204 associated therewith, wherein spectral vector 204 may contain one or more spectral measurements representing energy associated with the respective pixel 202. For example, FIG. 2 further illustrates an enlarged section 206 representing a particular row X' of pixels 202$a$-$n$ from one of the plurality of images 200$i$-$n$, wherein each of the various pixels 202$a$-$n$ in the row X' may have a spectral vector 204$a$-$n$ representing the energy associated with the respective pixel 202.

In an embodiment, hyperspectral image 200 may include BV set 208 having one or more BVs 210, which may be associated with one or more parameters for controlling error levels, fidelity, or other parameters of individual spectra in hyperspectral image 200. For example, a maximum error may be defined for each of pixels 200, wherein BV set 208 may include a minimum number of BVs 210 derived as a function of the maximum error defined for each respective pixel 200. In an embodiment, BV set 208 may be derived without a priori knowledge of imaged scene 106, wherein BVs 210 may instead be derived to span background materials, statistically sparse targets, or other relevant objects within scene 106. As an example, DIMRED system 100 may be configured to derive BVs 210 in a manner that represents endmembers for pixel spectra associated with unique objects or other targets in scene 106. In some embodiments, DIMRED system 100 may be configured such that analysts or other users may alternatively or additionally select one or more pixel spectra to be added to BV set 208, or one or more pixel spectra collected and/or measured a priori can be added to BV set 208. Basis vectors 210 provided in BV set 208 may then provide a reduced dimensionality data set for hyperspectral image 200 of scene 106, which can be processed by any known mechanism for processing hyperspectral data in the form of one or more basis vectors.

Figure 3:
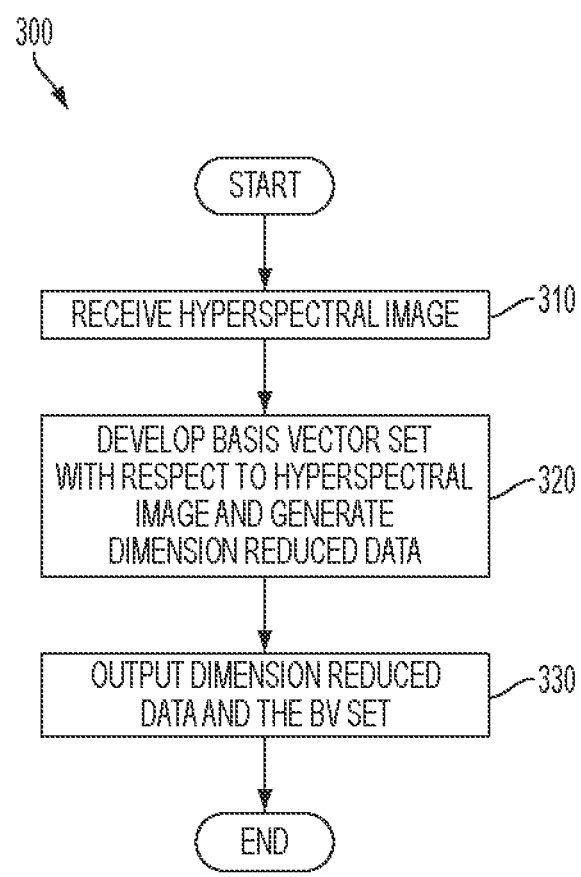
FIG. 3 illustrates an exemplary high level method for reducing dimensionality of one or more hyperspectral images, according to an embodiment.

FIG. 3 depicts an embodiment of a method 300 for reducing dimensionality of one or more hyperspectral images. It will be understood and appreciated that some elements of method 300 need not be performed in the particular order illustrated in FIG. 3 and described in further detail herein, but rather may be performed in any suitable order that can result in a reduced dimensionality data set from a data set corresponding to an incoming hyperspectral image. Furthermore, some steps of method 300 may be optional in some embodiments.

In an embodiment, method 300 may generally include any suitable sequence in which a data set for a hyperspectral image is received (operation 310). Although the hyperspectral image received at 310 may be similar to hyperspectral image 200 described above, and may similarly be received by remote imaging system 104 also described above, other configurations of the data set and hyperspectral imaging systems for receiving it are also possible. Once the hyperspectral image is received at 310, it may then be processed to establish a BV set for the hyperspectral image (operation 320).

As described in greater detail below, establishing the BV set at 320 may first include finding an initial BV, which may also be characterized as a seed BV, and may be utilized to establish the remainder of the BV set for the hyperspectral image. In some embodiments, the initial BV found at 320 may comprise a normalized pixel/vector selected at random from the hyperspectral image. In other embodiments, the initial BV may comprise a normalized pixel that is pre-determined on the hyperspectral image (such as, for example, the upper left pixel, the center-most pixel, or so on). In an embodiment, the initial BV may comprise a normalized vector that is calculated from two or more of the pixels in the hyperspectral image. For example, the calculated normalized vector may be averaged from across all pixels in the hyperspectral image. As another example, in some embodiments, the calculated normalized vector may exclude outliers (i.e. statistical anomalies). Other mechanisms for selecting or calculating the initial BV may be performed by any suitable process or input, and the examples described herein are not intended to be limiting in any way.

As described in greater detail below, establishing the remainder of the BV set may utilize the initial BV in an iterative process, by which each BV of the BV set is calculated by the previous BVs of the BV set. For example, in an extremely simplified example where there are only five pixels in the hyperspectral image, if the first pixel is normalized as the initial BV, BV(1), then BV(2) may be calculated from BV(1), BV(3) may be calculated from both BV(1) and BV(2), BV(4) may be calculated from BV(1), BV(2), and BV(3), and BV(5) may be calculated from BV(1), BV(2), BV(3), and BV(4). How each BV may be calculated from the previous BVs in some embodiments is described below.

As shown, in some embodiments, developing the BV set at 320 may include generating dimension reduced data that is associated with the hyperspectral image. In an embodiment, the dimension reduced data may be considered a dimension reduced image. In some embodiments, reducing the dimensionality of the hyperspectral image may include decomposing (e.g., unmixing) each pixel in the hyperspectral image to generate the reduced dimensionality data set. Unmixing, as used herein without further modifiers, is understood to generically refer to the broad concept of unconstrained unmixing. In some embodiments, the dimension reduced data may then be output at 330, and may be utilized for any suitable purpose, including undergoing further processing, being transmitted, stored, viewed, analyzed, or so on. In some embodiments, the BV set may be output either alongside or as part of the dimension reduced data. As is described in greater detail below, in some embodiments assembling the dimensionally reduced data may comprise utilizing stored results from calculations that were performed in establishing the BV set.

Figure 4:
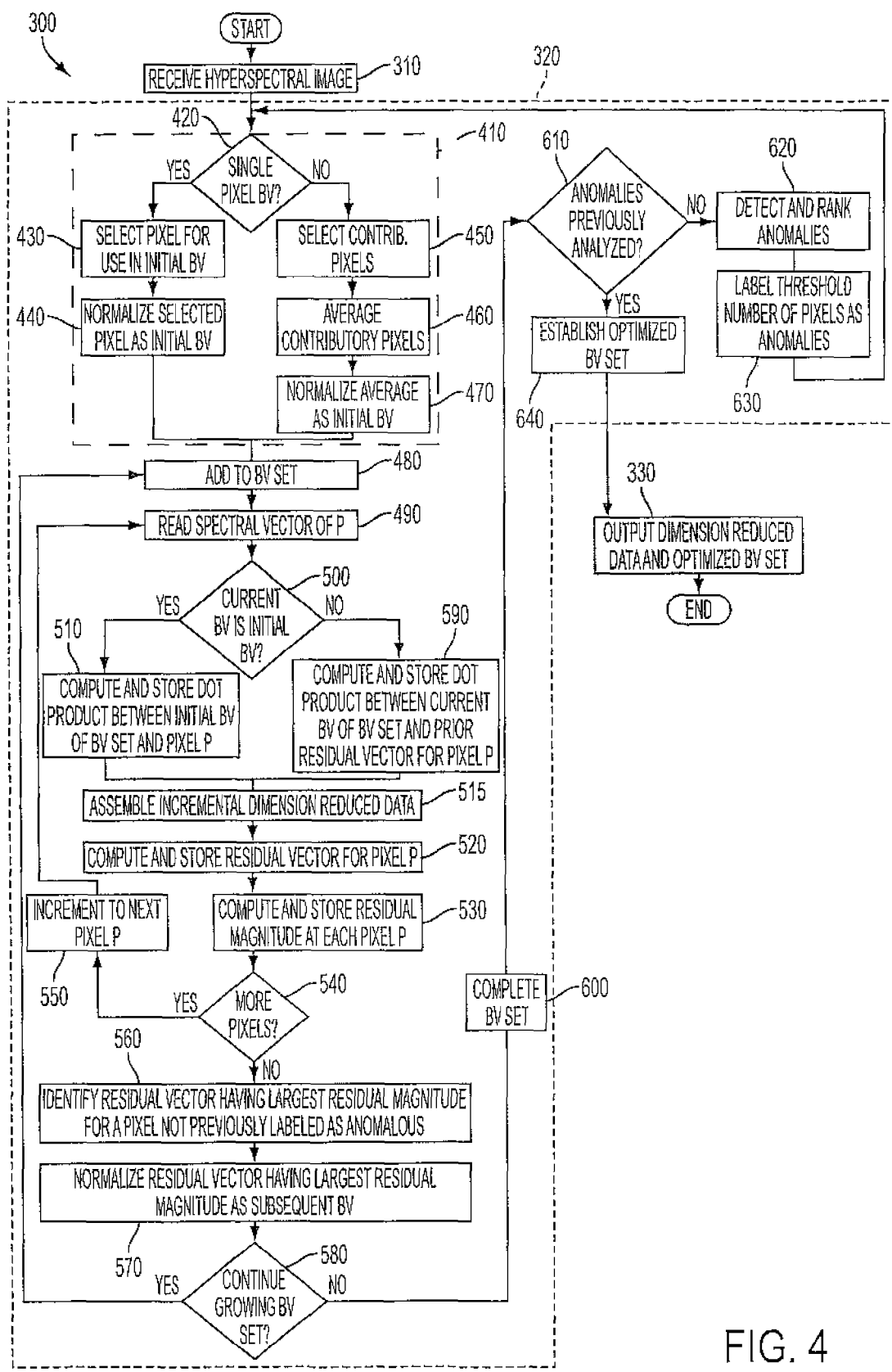
FIG. 4 illustrates an exemplary detailed method for reducing dimensionality of one or more hyperspectral images, according to an embodiment.

Turning to FIG. 4, additional details of an embodiment of method 300 for reducing dimensionality of a hyperspectral image may be appreciated. As above, method 300 first comprises receiving a hyperspectral image at 310. The hyperspectral image may be of any suitable type or configuration, and generally will comprise raw data in the form of a planar spatial dimensions (i.e. in an x-y coordinate system), and spectral data on a Z axis. Additional dimensions to the hyperspectral image are also possible, such that spectral vectors are recorded therein. Further as above, receiving the hyperspectral image at 310 may be by any suitable mechanism, including but not limited to reading out and accumulating the raw data from a hyperspectral imager, receiving transmitted data that was previously recorded, or accessing stored raw data from a storage device. In some embodiments, the hyperspectral image may previously be partially compressed or otherwise reduced in dimensionality, by which method 300 may attempt to further reduce the dimensionality.

Additionally, FIG. 4 illustrates an expansion of an embodiment of developing the BV set at 320. In the illustrated embodiment, developing the BV set at 320 may include determining an initial BV at 410, which may be used to further develop the BV set, as described below. Determining an initial BV may be accomplished by any suitable process. In some embodiments, the initial BV may be user-supplied. In other embodiments, the initial BV may be read from the hyperspectral image. In still other embodiments, the initial BV may be calculated from the hyperspectral image. As shown at 420, in some embodiments, the initial BV may be determined from either a single pixel, or calculated from multiple pixels of the hyperspectral image. Where a single pixel is being utilized to determine the initial BV, the pixel may be selected at 430. The selected pixel may be any pixel from the hyperspectral image. For example, in some embodiments it may simply be the first spatial pixel (i.e. the upper left pixel of the image), or may be chosen from the spatial center of the image. In other embodiments, the pixel used for the initial BV may be randomly selected. In some embodiments, certain outliers, such as statistical anomalies in the image, may be discounted when selecting the pixel. In an embodiment, a pixel having a median spectra may be selected. Once a pixel is selected, its spectral vector may be normalized at 440, to create a vector of unity length, which may be utilized as the initial BV.

In embodiments where multiple pixels are utilized to create the initial BV at 420, method 300 may include selecting the contributory pixels at 450. As above, in some embodiments the contributory pixels may be selected to discount outliers or other statistical anomalies. In some embodiments pixels at the edge of the hyperspectral image may be ignored. Although any number of calculations may be applied to the selected contributory pixels, in the illustrated embodiment the contributory pixels are averaged at 460, so that the initial BV will be an average representation from the scene. The averaged spectral vector calculated from 460 may then be normalized at 470, to create a calculated vector of unity length, which may then be utilized as a calculated initial BV.

After the initial BV is determined at 410, it may then be added to a BV set at 480. As its name implies, the initial BV may originally be the sole BV in the BV set. The current BV of the BV set (i.e. the most recent BV added to the set) may then be iteratively computed with each pixel to further develop the BV set. As such, the spectral vector of a first pixel is read at 490. If the current BV is the initial BV, determined at 500, then method 300 continues at 510 by computing the dot product between the initial BV of the BV set and the pixel P. As discussed in greater detail below, in an embodiment the dot product may also be stored for future reference. In an embodiment, method 300 may continue by assembling the dimensionally reduced data at 515. In an embodiment, assembling the dimensionally reduced data at 515 may comprise associating the dot product computed as part of a reduced dimension spectral vector for the pixel P. In an embodiment, storing the dot product at 510 may be directly into the reduced dimension spectral vector, such that the storing is a part of assembling the dimension reduced data at 515. As such, in an embodiment assembling the dimension reduced data may be an incremental or iterative assembly. As shown in the illustrated embodiment, method 300 may continue by computing and storing the residual vector for the pixel P at 520. In an embodiment, computing the residual vector at 520 comprises multiplying the dot product calculated in 510 with the current BV of the BV set, and subtracting the resulting quantity from the spectral vector of the pixel read at 490. In an embodiment, this calculation may result in the residual vector being orthogonal to the initial BV. In addition to computation of the residual vector, the residual magnitude for the pixel may also be computed and stored at 530. In an embodiment, the computation of the residual magnitude may be computed as the square root of the quantity of the square of the pixel magnitude minus the square of the dot product. In an embodiment the computation of the residual magnitude may also be stored in a memory for future reference.

Following computation of the residual magnitude at 530, method 300 may continue at 540 by ascertaining if there are additional pixels in the hyperspectral image. If there are additional pixels, method 300 may increment to the next pixel at 550, returning to 490 and continuing the calculations through the pixels of the hyperspectral image. Although in some embodiments pixels are incremented in an orderly fashion, the specific manner for incrementing pixels may include any suitable technique (e.g., from left to right, from right to left, from top to bottom, from bottom to top, randomly, etc.). If at 540 it is determined that there are no additional pixels in the hyperspectral image, method 300 may continue at 560 by identifying the residual vector having the largest residual magnitude. This may be accomplished, for example, by ranking the residual magnitudes associated with each pixel that were calculated at 530, and selecting the largest one therefrom. As shown in the illustrated embodiment, the identified residual vector may be the one having the largest residual magnitude that is associated with a pixel that has not been previously labeled as anomalous in a prior iteration, as described in greater detail below. Once the residual vector with the largest residual magnitude is identified, it is then normalized at 570. Since the magnitude of the vector was previously computed at 530, its magnitude would not need to be recomputed to normalize the vector, but rather the elements of the vector would just be divided by the previously computed residual magnitude. As previously indicated, the residual vector would be orthogonal to the seed vector. As such, by normalizing the orthogonal residual vector at 570, an orthonormal BV is established.

Method 300 may then continue at 580 by determining if the BV set is to be further developed. The determination as to how to further develop the BV set may be made by any appropriate measure. For example, in various embodiments the BV set may have a user-defined size that it will grow to. In an embodiment, the BV set may continue to grow until a calculated stopping point is reached. For example, in an embodiment the BV set will continue to grow until the residual magnitude calculated at 530 is below a selected threshold for each pixel. Other mechanisms for determining the size of the BV set are also possible. If the determination at 580 is to continue to grow the BV set, method 300 may continue by adding the orthonormal vector to the BV set at 480 as the new current BV.

The process then would repeat with the new current BV, which would be determined at 500 to not be the initial BV. As shown in FIG. 4, for subsequent BVs, instead of computing and storing the dot product between the initial BV and the pixel as was performed at 510, the dot product between the current BV and the prior residual vector for the pixel (which was calculated and stored for the pixel at the prior iteration of 520) is calculated and stored at 590. Again, the dot product may be used to further assemble the dimension reduced data at 515, as described above, and may in some embodiments be a part of the storing at 590. Although in some embodiments the calculations for the new dot products would replace those from the prior iteration, in other embodiments the calculations are retained throughout the DIMRED operation. The new dot product calculated at 590, which is based on the prior iteration, and thus is iteratively related to the initial BV, is then used when computing and storing the new residual vector for the pixel at 520. The new dot product is also used when computing and storing the new residual magnitude for the pixel at 530, which for the subsequent iterations would again use the residual magnitude which was previously computed. The computational enhancement from reutilizing prior calculations in subsequent iterations when establishing the BV set is clear.

As long as the BV set continues to grow, as determined at 580, the prior iteration's computations may be utilized to determine the subsequent BVs of the BV set. Because each BV is orthonormal to the seed vector, they are also mutually orthonormal to each other. Eventually, as described above, it may be determined that the BV set is complete. Method 300 would then continue at 600, whereby the normalized residual vector having the largest residual magnitude is added as the final BV of the BV set, completing the BV set. In some embodiments, such as that shown in FIG. 4, method 300 may include as part of developing the BV set anomaly analysis, which may determine a subset of pixels that are not to be included in the computation of the BV set. In the illustrated embodiment, it may be determined at 610 whether anomalies have previously been analyzed when computing the BV set. Although in some embodiments this will only be ascertained once, in other embodiments there may be an iterative anomaly analysis, wherein the BV set is continuously analyzed until certain conditions regarding anomalies are met. If anomalies have not been accounted for, however, method 300 may continue at 620, wherein the anomalies are detected and ranked.

In some embodiments, detecting and ranking the anomalies at 620 may utilize the first complete BV set established at 600. In other embodiments, detecting and ranking anomalies at 620 may utilize DIMRED data computed for the current BV set, such that method 300 may continue to generate dimension reduced data at 320 with the completed BV set from 600, before looping back, as described below. In an embodiment, anomalies may cause the first pass of the hyperspectral image to create the initial basis vector set with more basis vectors than desired (e.g., because the basis vectors were assigned to pixels that were atypical of the scene, generally corresponding to targets or sensor artifacts). Thus, in one implementation, detecting and ranking anomalies at 620 may include decomposing each pixel in the reduced dimensionality data set with the initial basis vectors derived for the reduced dimensionality data set to derive a residual vector and a fitting coefficient with respect to each of the basis vectors in the initial basis vector set. In some embodiments, the decomposing may comprise unmixing. As such, pixels may be identified in the reduced dimensionality data set that may qualify as anomalies, and such potentially anomalous pixels may be ranked according to the magnitudes of the residual vectors and/or the fitting coefficients for the potentially anomalous pixels. Based on the magnitude of the residual vectors and/or the fitting coefficients for the pixels that are ranked, some of which may have already been computed and stored when establishing the BV set, a predetermined percentage or ratio of the pixels that are more than a particular threshold from zero may then be considered a potential "anomaly." Alternatively, every pixel that varies from zero by more than the threshold may be a potential anomaly. In some embodiments, method 300 may apply other algorithms for anomaly detection, including but not limited to the conventional "R-X algorithm," which may make use of the calculations and/or data generated in method 300 or associated with the hyperspectral image.

After detecting and ranking the anomalies at 620, method 300 may continue at 630 by labeling a threshold number of pixels as anomalous, and characterizing the remaining (non-anomalous) pixels in the scene as "common." In an embodiment, such labeling is only for the purposes of establishing the optimized BV set, whereby all pixels in the hyperspectral image will ultimately be reduced. In an embodiment, in addition to the anomalous pixels, pixels that appear in a predetermined neighborhood of the anomalous pixels, or are otherwise associated with the anomalous pixels, may also be considered anomalous. For example, the neighborhood of the anomalous pixels may be defined to include any pixels within a particular window surrounding the anomalous pixels (e.g., the window may include the eight pixels immediately adjacent to any particular anomalous pixel, although the window may vary in size depending on the particular application). In other embodiments, the neighborhood of the anomalous pixels may be defined to include a number of pixels in the same row and/or the same column as the anomalous pixels. In an embodiment, the entire row or the entire column of pixels associated with an anomalous pixel may also be considered anomalous. As such, setting aside the anomalous pixels and any pixels in the neighborhood of the anomalous pixels may result in less pixels being eligible to be used in establishing the BV set. In some embodiments, worst case error or mean-squared error may be measured on all of the pixels of the hyperspectral image, or a subset thereof (i.e. the non-anomalous pixels), to determine inclusion or exclusion of the pixels in establishing the BV set. For example, in an embodiment an adaptive error threshold may be applied, such that anomalous pixels having a larger residual magnitude than the worst case error on the compressed pixel may be set aside as "raw" pixels. As such, in various embodiments the DIMRED data may include both raw pixels and dimensionally reduced pixels for some or all of the hyperspectral imaged.

As shown in the embodiment of FIG. 4, once the anomalous pixels are labeled as such, a new BV set may be computed by utilizing a reduced hyperspectral image that omits the anomalies. In the illustrated embodiment the new hyperspectral dataset is treated as the received hyperspectral image at 310, such that an initial BV is again established at 410. Such a renewed calculation may be useful, as the randomly or pre-determined pixel may itself have been anomalous during the first determination of the BV set. Even where the previous initial BV was averaged over the pixels, the inclusion of anomalous pixels in computing the initial BV may itself have skewed results. In other embodiments, however, a seed BV may have been previously known as non-anomalous, and thus the initial BV might be retained from the previous calculation of the BV set. In some embodiments, the second BV set may or may not include a maximum number of members for the new BV set. However, if a particular compression ratio is required for the reduced data set to be produced in the second pass, a maximum number of members may be defined for the new BV set so as to insure the relevant compression ratio.

As such, the number of BVs in the reduced data set produced in the second pass may have a substantially reduced number of members after the anomalous pixels in the scene have been labeled such (i.e., as compared to the initial set of basis vectors). Furthermore, the reduced data set produced in the second pass may suitably span a complex scene even with the substantially reduced number of basis vectors. In particular, the anomalous pixels in the scene may generally correspond to the most unique or unusual aspects of the scene, whereby removing the anomalies may preserve those aspects of the scene that are most likely to be relevant to detecting targets in the scene or detecting changes from prior versions of the scene. In addition, reducing the dimensionality of the hyperspectral image by performing multiple passes when generating the BV set, with the anomalous pixels not used to generate BVs in the second pass, may provide a larger compression or reduction ratio for the final reduced data set because the second pass dimensionality reduction pass might only be applied to the most typical or otherwise common aspects of the scene. Thus, preserving the full dimensionality of the anomalous pixels and the pixels in the neighborhood of the anomalous pixels may provide the maximum information content that may be relevant to analyzing the reduced data set for the scene.

In some embodiments, the calculations that were utilized when establishing the prior BV set (i.e. the first BV set, when the anomalies of the BV set determined at 610 is only analyzed once) may be further utilized by retrieving them from where they were previously stored. Because the BV set is iteratively grown, the calculations that are stored may in some embodiments lose their computational usefulness once a first anomalous pixel is passed over. For example, if the first ten pixels are non-anomalous, but the eleventh pixel was anomalous, then the computations (i.e. the dot product computation at 510/590, the residual vector computation at 520, and the residual magnitude computation at 530) completed for the first ten pixels may be reutilized, provided that the initial BV is maintained.

As indicated above, in an embodiment the determination at 610 may be recursive. In such an embodiment the common pixels may be again analyzed at 620 to detect whether any further anomalies are present in the reduced data set produced in the second pass, wherein the reduced data set produced for the common pixels may be processed again in a similar manner as described above. If, however, it is determined at 610 that the anomalies have been accounted for, then method 300 may continue at 640, where the optimized BV set is established, generally without the influence of anomalous pixels. As shown, method 300 may then continue to 330, whereby the dimension reduced data (i.e. the dimension reduced hyperspectral image) may be output. In an embodiment, such as that shown, the dimension reduced data may further be output with the optimized BV set established at 640.

In an embodiment, the dimensionally reduced hyperspectral image incrementally assembled at 515 and output at 330 may comprise the same X/Y dimensions as the hyperspectral image received at 310, however contains reduced spectral data instead of unreduced spectral data. In an embodiment, the reduced dimension spectral data for each X/Y pixel comprises the dot products stored at 510 and 590. As also shown, in some embodiments the optimized BV set established at 640 may additionally be output at 330, either alongside or as a part of the dimensionally reduced data. In some embodiments, the reduced spectral data may be constructed as a linear combination of the BVs of the BV set. In some embodiments, the coefficient for each BV in this linear combination is the previously obtained dot product. While in some embodiments, the dot product may become an element of the reduced dimensionality vector at each X/Y location (i.e. for each pixel) during incremental assembly of the dimensionally reduced data at 515, in other embodiments the results of the calculations may be stored separately for subsequent assembly into the dimension reduced image. In an embodiment, the reduced dimensionality vector at each X/Y location is the set of dot product results for each BV in the BV set, such that the spectrum of the pixel can be constructed by a linear combination of the BV with the dot product results as coefficients. In some embodiments those pixels labeled as anomalies (i.e. as described above) might not be included in the reduced dimensionality data. In other embodiments the spectral data associated with the anomalous pixels may be segregated and additionally output at 330, including as a separate data set. In an embodiment, the X/Y location of each pixel may be encoded in the two separate lists of reduced dimensionality pixels: i.e. with coefficients for each BV, and with the anomalous pixels, with intensities in each spectral band. In an embodiment, the DIMRED data that is output at 330 may comprise a three dimensional data set, represented as a reduced dimensionality hypercube corresponding to the hyperspectral image received at 310.

Figure 5:
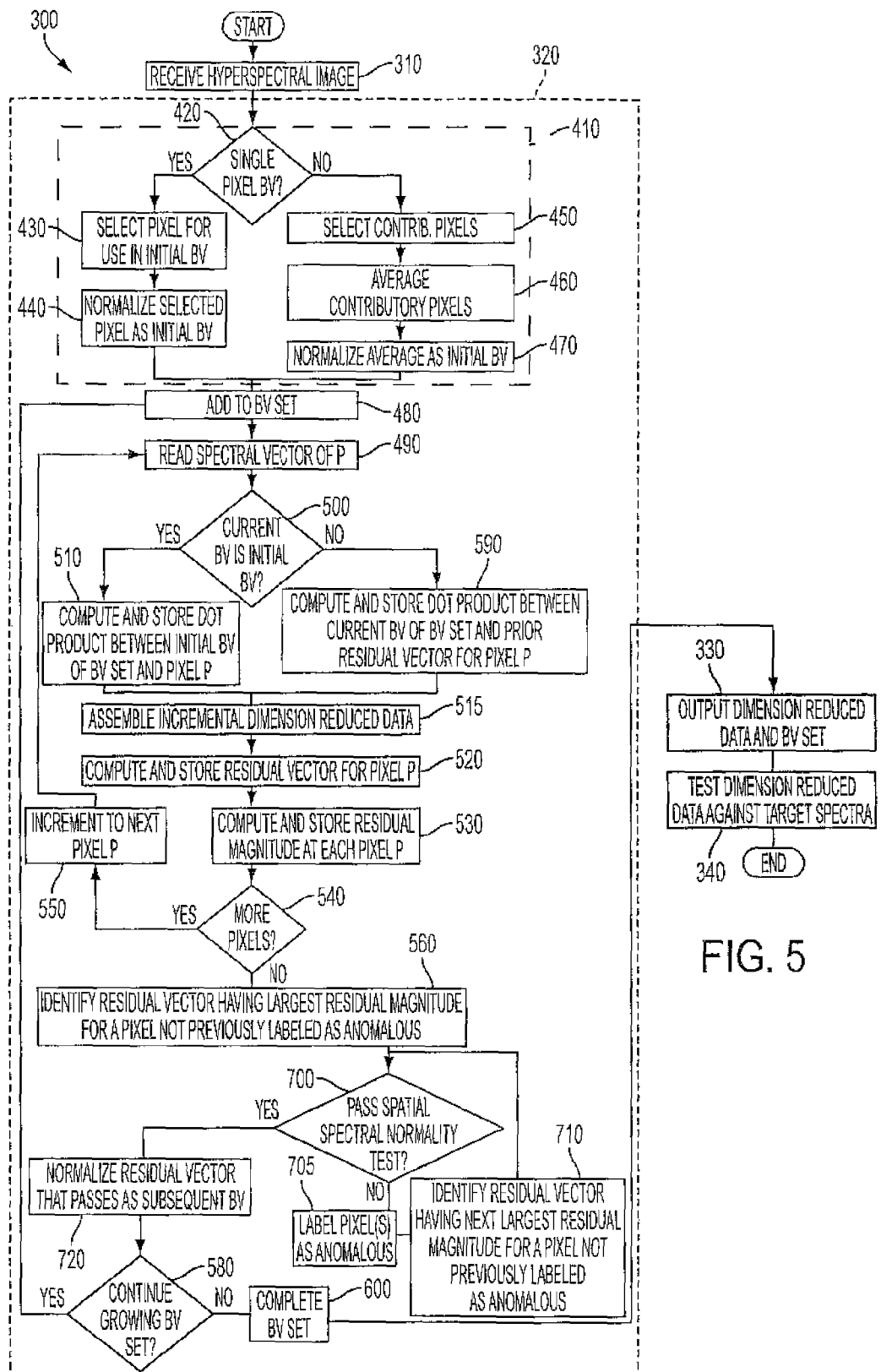
FIG. 5 illustrates another exemplary detailed method for reducing dimensionality of one or more hyperspectral images, according to an embodiment.

Turning to FIG. 5, it may be appreciated that in some embodiments accounting for anomalies may occur during the identification of which pixels are used to establish the BV set. For example, the illustrated embodiment of method 300' shares numerous characteristics with that of method 300 described above, however does not include anomaly detection following establishment of a BV set. Instead, after calculation of the residual magnitudes 530 for a given BV, when the residual vector having the largest residual magnitude is identified at 560 (which, as above, may be specifically for pixels not previously labeled as anomalous), it is tested at 700 to see if it passes a spatial-spectral normality test. In an embodiment the spatial spectral normality test may be a multi-part test that may determine various levels of deviance for the tested pixel. For example, in an embodiment the spatial spectral normality test may include a spectral artifact test, wherein the pixel associated with the largest residual magnitude is tested for positive and/or negative spikes that are greater than a given threshold. In some embodiments, the threshold may be user-defined, while in other embodiments it may be calculated based on the hyperspectral image. As an example, each spectral element may be tested against the mean and the standard deviation of all spectral elements. If the spectral element exceeds the threshold, the element may be characterized as an artifact. If the spectral element is within the spectral test's threshold, then a spatial test may be applied.

In an embodiment, the spatial test may compare the residual magnitude of the pixel to a predefined neighborhood around the element, to see if the residual magnitude is more than a factor above the average of the neighborhood. In another embodiment, a standard deviation of the neighborhood may be calculated, and the spatial test may determine whether the residual magnitude of the selected pixel is more than a number of standard deviations (i.e. $3\sigma$) above the standard deviation of the neighborhood). As before, where the residual magnitudes have already been computed and stored across the hyperspectral image, the magnitudes may simply be loaded and compared, instead of being recalculated. In some embodiments, the defined neighborhood may be user-selectable. In a non-limiting example, the spatial neighborhood may be a 16×16 region around the selected pixel. In other embodiments, instead of testing a local neighborhood, the entire scene may be analyzed in the spatial test. In some embodiments, if the pixel fails the spectral test, it may be characterized as an anomaly.

If the selected pixel fails the spatial spectral normality test at 700, it may be rejected as a potential BV. In some embodiments, such as that shown, the selected pixel may be labeled as rejected at 705, so as to prevent the pixel or associated pixels from being tried again as a BV in a subsequent iteration. In some embodiments, groups of associated pixels may be simultaneously labeled as rejected at 705 to prevent usage as BVs. Instead, method 300' may proceed to 710, wherein the residual vector having the next largest residual magnitude is selected, and tested by the spatial spectral normality test at 700 (again, in some embodiments excluding those for pixels previously labeled as anomalous). In an embodiment, once a residual vector passes the spatial spectral normality test at 700, method 300' may proceed to 720, whereby the vector is normalized to be established as the subsequent BV. Method 300' may then continue at 580, as described above, by determining if the BV set is to continue growing. If it is, method 300' would return to 480, by adding the new BV to the BV set, and utilizing it to further develop the BV set. If the BV set is determined as complete, then method 300' continues to 600, where the BV set is considered complete. As shown, in some embodiments the application of the spatial spectral normality test at 700 may make redundant any need for optimizing the BV set by detecting and ranking anomalies at 620, as described above. Instead, in such embodiments, the completed BV set at 600 may be established as already optimized, and method 300' may continue by outputting the DIMRED data at 330, as described above.

Although in some embodiments the DIMRED data may be subsequently stored in a memory arrangement for future analysis, in an embodiment such as that shown in FIG. 5, the final output at 330 may subsequently be tested for one or more known targets at 340. In particular, the DIMRED data may generally include a reduced data set for all pixels in the hyperspectral image and an unreduced data set for the anomalous pixels, i.e., if the final reduced data set is to be tested for known targets, the copies of the anomalous pixels may remain unreduced to ensure that the maximum information content is preserved for analysis, while the anomalous pixels in the reduced data set may be accessed for applications simply requiring capturing and storing a suitable data set for the scene. In various embodiments, testing the hyperspectral image for known targets may include testing the unreduced data set and/or the reduced data set for known targets. In an embodiment, the known target might be dimensionally reduced utilizing the BV set that reduced the hyperspectral image, for equivalent spectral dimensionality comparison. For example, in an embodiment reducing the dimensionality of the target spectral vector may comprise computing the dot product of target vector with each BV in the BV set, such that the resulting dot product coefficients form a DIMRED target vector. In an embodiment, the dimension reduced target vector may then be compared with the DIMRED vectors across some or all of the pixels of the dimension reduced data, to determine if the target (or a spectral vector within a threshold amount of the target) is present within that pixel. Such testing may be with known spectra corresponding to known targets, and which may be stored in a spectral signature database. For example, certain materials or targets may be known to have particular spectral characteristics, which may provide known signal waveforms that may be used to detect such known materials or targets within a particular pixel.

It may be appreciated that the dimensionally reduced spectral data may in some embodiments be reconstituted back into data that at least approximates the original spectral data. For example, in an embodiment by multiplying each element of the dimensionally reduced vector (i.e. the dot products) by the associated BV that was additionally output at 330, then a number of new vectors may be formed equal to the dimensionality of the reduced dimension spectral data. By summing the new vectors, a vector having the dimensionality of the original hyperspectral vector at that pixel is formed, which at least approximates the original hyperspectral vector.

Figure 6:
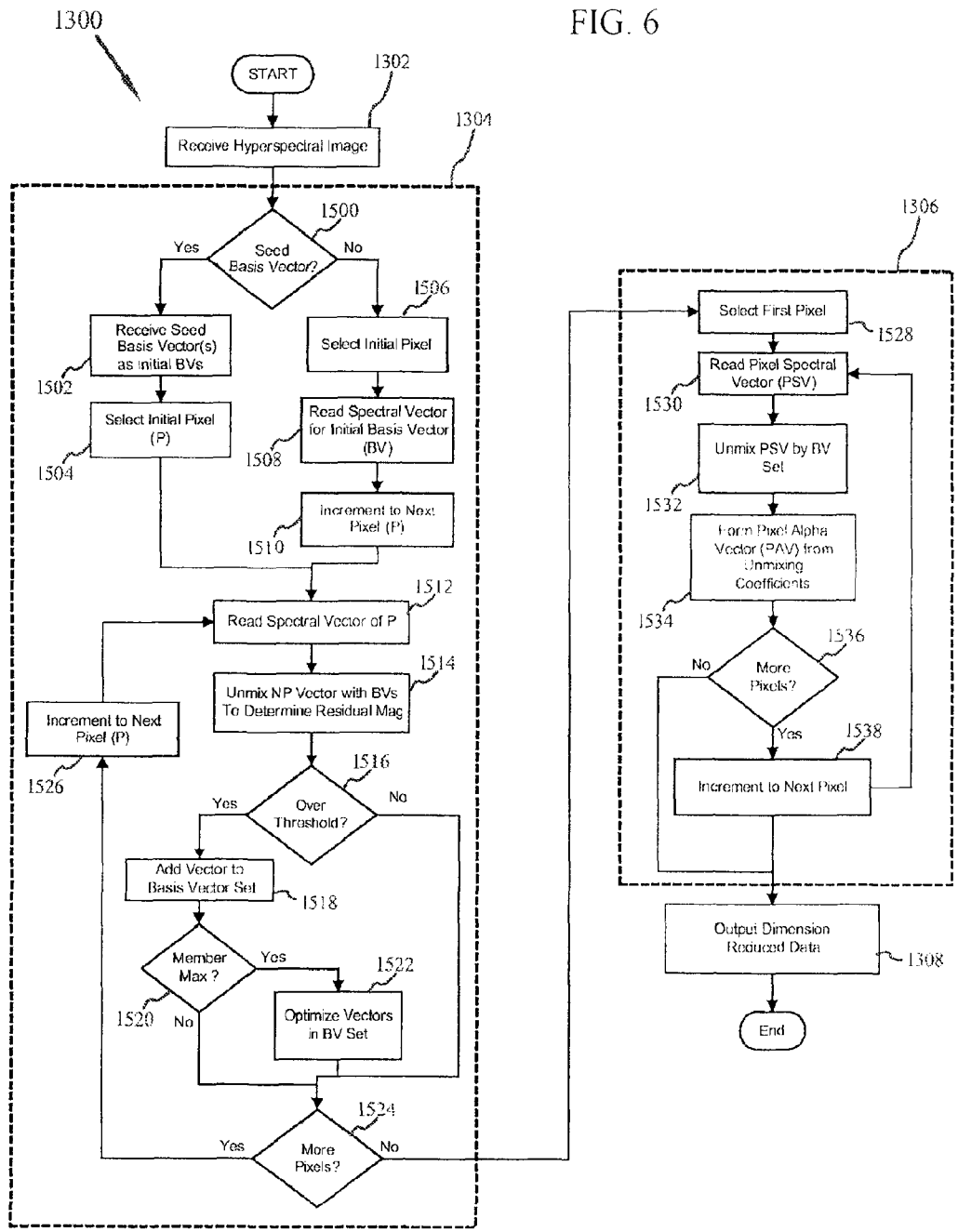
FIG. 6 illustrates another exemplary detailed method for reducing dimensionality of one or more hyperspectral images, according to an embodiment.

Depicted in FIG. 6 is another embodiment of a DIMRED method, specifically method of hyperspectral image dimension reduction 1300. It is understood and appreciated that the method need not be performed in the order herein described but rather is presented for ease of discussion and illustration in accordance with at least one embodiment.

Moreover, in at least one embodiment, a hyperspectral image is provided, block 1302. A BV set is developed with respect to the hyperspectral image, block 1304. Then, with the BV set established, each pixel is decomposed with the BV set to provide a plurality of alpha vectors, block 1306. These alpha vectors are provided as the reduced data set of the output scene, block 1308.

More specifically, as shown in FIG. 6, in at least one embodiment the process of developing the BV set commences with analysis of whether a seed basis vector has been provided, decision 1500. Stated simply, the basis vector set provides a collection of spectral vectors by which the spectral vectors of all pixels within the hyperspectral image are evaluated. Whereas in at least one embodiment, the evaluation and comparison is based entirely upon data already present in the hyperspectral image itself, in at least one embodiment at least one basis vector is provided by an operator or is read from a default file. Such a basis vector may, for example, correspond to the spectral vector of a particular material known to exist or expected not to exist, within the geographic area from which the hyperspectral image was formed.

Where one or more seed vectors are provided as initial basis vectors, the seed basis vector(s) is received and added to the basis vector set, block 1502. To develop the reset of the BV set, an initial pixel (P) is selected, block 1504. Generally, and in at least one embodiment, the initial pixel is selected to be the first pixel in the top left or bottom left corner, the pixels to be compared in an incremental step pattern across each row X.

Where a seed vector is not provided, decision 1500, an initial pixel is immediately selected, block 1506. The spectral vector for this initial pixel is then read by the spectrum reader and this initial spectral vector is used as the initial basis vector for the further development of the BV set, block 1508. In at least one embodiment, the selection of the initial pixel to determine the initial basis vector is a random selection. In at least one alternative embodiment, the initial pixel is selected to be either the top left or bottom left corner pixel.

Moreover, if a seed basis vector(s) is provided then it is treated as if it was the determined basis vector from an initial pixel and the process immediately commences with unmixing and testing as discussed below. If a seed basis vector is not provided, then a pixel is selected and its spectral vector is adopted as the initial basis vector, and then the process commences with unmixing and testing as set forth below.

With an initial basis vector so determined, the process increments to select the next pixel (P), block 1510. Generally, and in at least one embodiment, it is understood and appreciated that the pixels will be incremented through in a left to right iteration for each row X.

The process now continues with the reading of the spectral vector of pixel P, block 1512. The spectral vector of the selected pixel is then decomposed with the members of the developing BV set. In at least one embodiment the decomposition is performed by unmixing the spectral vector with the members of the BV set.

Generally stated, unmixing is understood and appreciated to be, in essence, an algebraic approach to decomposing the spectral vector into its component parts. For example, a spectral vector from a given pixel may comprise the spectrum elements indicative of grass, aluminum and sand, and thus be a composite spectral vector. When this vector is unmixed with vectors representative of aluminum and sand, the spectral vector of grass will be revealed. The unmixing process provides alpha coefficients representative of the abundance of the basis vectors and will provide a residual vector. The vector that is unmixed is an algebraic combination of the basis vectors, weighted in some fashion by the alpha coefficients plus the residual vector.

In at least one embodiment, the magnitude of the residual vector is then determined, and is understood and appreciated to be derived from the square root of the dot product of the residual vector with itself, otherwise known as Euclidean distance provided by the equation:

$$\|x\| = \sqrt{x_1^2 + \ldots + x_n^2}.$$

where $x = [x_1, x_2, \ldots, x_n]$.

The magnitude of the residual vector is then evaluated with a threshold value, decision 1516. In at least one embodiment the threshold value is provided by an operator. The threshold value may also be a pre-determined value that is hard coded into the method. If the magnitude is over the threshold, decision 1516, the spectral vector is added to the BV set, block 1518. In some embodiments, there may be a pre-determined maximum number of members of the BV set. When the total number of members is below this pre-determined maximum there is of course no issue and the new spectral vector is simply added to the BV set, decision 1520.

If, however, the maximum number of members has been reached, the members of the BV set are optimized, block 1522. Various optimization methods may be employed and in general the type of optimization strategy adopted is determined by an operator. These methods may include, but are not limited to, optimization to selection of the maximum spectral vectors (e.g., the spectral vectors having the greatest magnitudes), optimization to select the greatest range between the spectral vectors, optimization to select the spectral vectors closest to a spectral vector mean, optimization to select the spectral vectors closest to a spectral median.

In at least one embodiment, the residual magnitude is stored when a basis vector is added to the BV set. When the maximum number for the BV set is reached, the magnitude of a new residual must be larger than the smallest residual computed from the existing members of the BV set. If it is not, the new basis vector is not added. If it is, then the new basis vector is added and the basis vector that previously had the smallest residual is removed.

As indicated above, in at least one embodiment the user is permitted to provide seed basic vectors. In at least one such embodiment where the user has also set a maximum number for the BV set, the seed basis vector(s) are treated as special and maintained as core elements of the BV set. In one embodiment, this is achieved by tagging the seed vectors such that they are not considered in the elimination evaluation process. Moreover, in at least one embodiment the maximum number of BV set members does not include the seed basis vector(s).

In an alternative embodiment, the maximum number of BV set members may indeed include the seed basis vector(s), but they are simply not included in the evaluation for removal process. As such, key factors that are indicated by the seed vector(s) are maintained within the BV set.

Having resolved the question of whether to add the residual vector to the BV set. and whether to optimize the BV set, the method continues to select the next pixel, decision 1524. If indeed more pixels remain then the method will increment to the next pixel, block 1526. It should be understood and appreciated that, although the incremental process is intended to be orderly, the type of incrementing—left to right, right to left, top to bottom, bottom to top, or random—is largely immaterial. The key element is that each pixel of the hyperspectral image is being evaluated so as to determine an appropriate set of basis vectors that are, in at least one embodiment, inherently tied to hyperspectral image itself.

With the BV set so established, the method now continues with the generation of the alpha vectors, block 1306. As in the development of the BV set, the generation of the alpha vectors begins with the selection of an initial pixel, block 1528. The spectral vector is then read from the selected pixel, block 1530. The spectral vector is then decomposed with the BV set, block 1532. In at least one embodiment the decomposition is performed as unmixing, as discussed above. It is to be realized that for each member of the BV set there will be a corresponding value, an unmixing coefficient. There will also be a residual vector.

For the given pixel, the unmixing coefficients represent an alpha vector for the given pixel. It is further understood and appreciated that the relative magnitude of dimension reduction is approximately the difference between the number of elements in a spectral vector originally present in the hyperspectral image and the number of members in the applied BV set. For example, if there were originally one-hundred spectral bands present in the hyperspectral image, and twenty basis vectors in the BV set, the dimension reduction represented by the alpha vectors would be about eighty or a factor of five.

The process is continued for each pixel, as indicated by the query to determine the presence of more pixels, decision 1536, and the increment to the next pixel, block 1538 and the return to read the spectral vector for the selected pixel, block 1530. Moreover, all of the pixels in the hyperspectral image scene are unmixed with the BV set so as to provide vectors having g coefficients (corresponding to the number of members in the BV set) and a residual vector for each X-Y location.

When the generation of alpha vectors has been accomplished for all pixels of the hyperspectral image, the resulting set of alpha vectors is provided as the output scene, namely a dimensionally reduced hypercube. Because of the application of the BV set, which is derived from the spectral vectors of each pixel, to each pixel, the resulting information of each alpha vector has approximately the same information content as the original pixel. More specifically, the reduced alpha vector is still representative of the composite spectral frequencies present in the pixel, such a combination of grass, sand and metal as present in the original spectral vectors is still represented in the alpha vector. Furthermore, and quite advantageously, the dimensionally reduced image provided by the alpha pixels is suitable for processing without regeneration of the original image. Further, the maximum loss of information on any pixel is minimized compared to any other dimensionality reduction process. This is crucial when the image is processed for subtle changes, the presence of small targets or anomalies.

Decompression of the output image can be accomplished with the use of the BV set. As such, in at least one embodiment the BV set is provided as output with the dimension reduced image. The residual vectors, if left untreated are understood to be of the same size as the original data set. Calculating the magnitude for each residual vector greatly reduces the volume of the data once again.

Indeed, in at least one embodiment the magnitude of each residual vector is also determined and provided as output in addition to dimensionally reduced image represented by the alpha vectors. Moreover, it is understood and appreciated that in varying embodiments, the method 1300 may provide: the alpha vectors, the magnitude of the residual vectors, the BV set, and combinations thereof. As such, it is understood that the method is adaptable to provide compression and dimension reduction options that range from lossy to lossless.

Although in various embodiments the DIMRED methods described herein may be implemented on any appropriate system or hardware, such as DIMRED system 100 described above. In some embodiments, DIMRED system 100 may be implemented on a computer system, which may generally include typical computer components such as one or more processors, memory modules, storage devices, input and output devices, and so on. In an embodiment, DIMRED system 100 may be maintained in an active memory of the computer system to enhance speed and efficiency, and may further be coupled to a computer network and utilize distributed resources associated with the computer network. In various embodiments, DIMRED system 100 may include one or more interfaces, one or more spectrum readers, and one or more modules that may perform establishing the BV set, decomposing the hyperspectral image, and evaluating the hyperspectral image. In some embodiments, the one or more interfaces may be configured to receive data corresponding to one or more hyperspectral images, one or more BVs provided by a user, an indication as to whether dimensionality reduction is to be performed as a lossy or lossless operation, tolerance levels for the amount of lost data in the dimensionality reduction, and/or other information relating to the processing of hyperspectral images. In an embodiment, the one or more interfaces may be arranged to receive information directly from the user via an input device associated with DIMRED system 100, or directly from a component of DIMRED system 100 (such as from detector array 116 depicted in FIG. 1).

According to an embodiment, implementations of the various systems and methods for reducing dimensionality of hyperspectral images described herein may be made in hardware, firmware, software, or various combinations thereof. For example, the systems and methods for reducing dimensionality of hyperspectral images may be implemented as computer executable instructions stored on a non-transitory machine readable medium, which may be read and executed using one or more physically separate or communicatively coupled computer systems or other processing devices. The machine readable medium may include various mechanisms for storing and/or transmitting information in a manner readable by the computer systems, the processing devices, or other machines. For example, a machine readable storage medium may include read only memory, random access memory, magnetic disk storage media, optical storage media, flash memory devices, hard drives, and other media for storing information, and a machine readable transmission media may include signals such as carrier waves, infrared signals, digital signals, and other media for transmitting information. Additionally, although the above disclosure may describe methods, firmware, software, routines, or instructions in terms of specific exemplary aspects and implementations and performing certain actions, it will be apparent that such descriptions are merely for the sake of convenience and that such actions in fact result from the computer systems, the processing devices, processors, controllers, or other devices or machines executing the firmware, software, routines, or instructions.

Furthermore, aspects and implementations may be described in the above disclosure as including particular features, structures, or characteristics, but it will be apparent that every aspect or implementation may or may not necessarily include the particular features, structures, or characteristics. Further, where particular features, structures, or characteristics have been described in connection with a specific aspect or implementation, it will be understood that such features, structures, or characteristics may be included with other aspects or implementations, whether or not explicitly described. Thus, various changes and modifications may be made to the preceding disclosure without departing from the scope or spirit of the inventive concept, and the specification and drawings should therefore be regarded as exemplary only, with the scope of the invention determined solely by the appended claims.

What is claimed is:

1. A method for reducing dimensionality of hyperspectral images, comprising:
   receiving, from a sensor, a hyperspectral image having a plurality of pixels;
   using a processor, establishing an orthonormal basis vector set comprising a plurality of mutually orthogonal normalized members, each associated with one of the plurality of pixels;
   using the processor, decomposing the hyperspectral image into a reduced dimensionality image utilizing calculations performed while establishing said orthonormal basis vector set; and
   wherein establishing the orthonormal basis vector set comprises, in a first iteration:
      initializing the basis vector set with an initial basis vector;
      for each of the plurality of pixels:
         computing and storing, in a memory, a single dot product between the initial basis vector and a spectral vector of a current one of the plurality of pixels; and
         computing and storing, in the memory, a current residual vector and a residual magnitude for the current one of the plurality of pixels utilizing the dot product;
      normalizing the residual vector associated with a pixel that has the largest residual magnitude of the plurality of pixels as a normalized residual vector; and
      adding the normalized residual vector to the basis vector set.

2. The method of claim 1, wherein initializing the basis vector set comprises selecting an initial pixel from the plurality of pixels and normalizing the spectral vector of the selected initial pixel as the initial basis vector.

3. The method of claim 1, wherein initializing the basis vector set comprises selecting a plurality of contributory pixels from the plurality of pixels; averaging the contributory pixels;
   and normalizing an average spectral vector of the selected initial pixel as the initial basis vector.

4. The method of claim 1, wherein establishing the orthonormal basis vector set comprises, in a subsequent iteration:
   for each of the plurality of pixels:
      computing and storing, in the memory, a new dot product between the a current basis vector and the current residual vector of the current one of the plurality of pixels from a prior iteration; and
      computing and storing, in the memory, a new residual vector and a new residual magnitude for the current one of the plurality of pixels utilizing the new dot product;
   normalizing the new residual vector associated with a pixel that has the largest new residual magnitude of the plurality of pixels as a new normalized residual vector; and
   adding the new normalized residual vector to the basis vector set.

5. The method of claim 4, wherein computing the new residual vector for the current one of the plurality of pixels in the subsequent iteration includes:
   multiplying the current basis vector by the dot product of the current basis vector with the current residual spectral vector of the current one of the plurality of pixels to produce a vector; and
   subtracting the vector from the current residual vector of the current one of the plurality of pixels to produce the new residual vector for the current one of the plurality of pixels.

6. The method of claim 4, further comprising composing a reduced dimension vector for the current one of the plurality of pixels from the single dot product computed in the first iteration and the dot product computed in the subsequent iteration, the reduced dimension vector being part of an ensemble of reduced dimension vectors representing a dimensionality reduced version of the hyperspectral image.

7. The method of claim 1, wherein establishing the orthonormal basis vector set comprises optimizing the basis vector set to exclude anomalous pixels.

8. The method of claim 7, wherein optimizing the basis vector set includes testing one or more of the plurality of pixels against a user-defined threshold, wherein if the one or more of the plurality of pixels exceeds the user-defined threshold, then the one or more of the plurality of pixels is not utilized establish the basis vector set.

9. The method of claim 8, wherein the user defined threshold is associated with a mean or standard deviation across a plurality of spectral elements in the hyperspectral image.

10. The method of claim 8, wherein the user-defined threshold determines a neighborhood of pixels proximal to the tested one or more of the plurality of pixels.

11. The method of claim 8, wherein optimizing the basis vector set comprises computing a new basis vector set while ignoring the anomalous pixels.

12. The method of claim 1, further comprising: testing the reduced dimension image formed from the orthonormal basis vector set and/or raw anomalous pixels unassociated with the orthonormal basis vector set to detect whether one or more targets having known spectral characteristics are present in a scene corresponding to the hyperspectral image.

13. The method of claim 1, wherein computing the residual vector for the current one of the plurality of pixels in the first iteration includes:
   multiplying the initial basis vector by the dot product of the initial basis vector with the spectral vector of the current one of the plurality of pixels to produce a vector; and
   subtracting the vector from the spectral vector of the current one of the plurality of pixels to produce the residual vector for the current one of the plurality of pixels.

* * * * *